(12) United States Patent
Amano

(10) Patent No.: US 12,103,179 B2
(45) Date of Patent: Oct. 1, 2024

(54) METHOD OF CONTROLLING ROBOT BODY, METHOD OF MANUFACTURING PRODUCT, ROBOT APPARATUS, AND RECORDING MEDIUM

(71) Applicant: CANON KABUSHIKI KAISHA, Tokyo (JP)

(72) Inventor: Shingo Amano, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 320 days.

(21) Appl. No.: 16/597,170

(22) Filed: Oct. 9, 2019

(65) Prior Publication Data

US 2020/0114507 A1    Apr. 16, 2020

(30) Foreign Application Priority Data

Oct. 12, 2018 (JP) .................. 2018-193504

(51) Int. Cl.
  B25J 9/16    (2006.01)
  G05B 19/414  (2006.01)

(52) U.S. Cl.
  CPC ............ *B25J 9/1612* (2013.01); *B25J 9/161* (2013.01); *B25J 9/1679* (2013.01); *G05B 19/414* (2013.01); *G05B 2219/37097* (2013.01); *G05B 2219/39* (2013.01); *G05B 2219/40* (2013.01)

(58) Field of Classification Search
  CPC ... B25J 9/16; B25J 9/1612; B25J 9/161; B25J 9/1679; B25J 9/1687; B25J 9/1602; G05B 19/00; G05B 19/02; G05B 19/18; G05B 19/414; G05B 2219/40; G05B 2219/37; G05B 2219/37097; G05B 2219/39; G05B 2219/39532; G05B 2219/40606; G05B 2219/39322; G05B 2219/45064; G05B 2219/45

See application file for complete search history.

(56) References Cited

U.S. PATENT DOCUMENTS

| | | | |
|---|---|---|---|
| 9,517,560 B2 | 12/2016 | Amano | |
| 9,669,545 B2 | 6/2017 | Suzuki et al. | |
| 10,279,479 B2 | 5/2019 | Suzuki et al. | |

(Continued)

FOREIGN PATENT DOCUMENTS

| JP | 2014046449 A | * | 3/2014 |
|---|---|---|---|
| JP | 2015089582 A | * | 5/2015 |
| JP | 2018-126857 A | | 8/2018 |

*Primary Examiner* — Khoi H Tran
*Assistant Examiner* — Sarah A Tran
(74) *Attorney, Agent, or Firm* — Venable LLP

(57) ABSTRACT

A method includes controlling a robot body performed by a controller. The robot body includes a finger, a driving unit, and a detection unit. The driving unit is configured to move the finger. The detection unit is configured to output a signal corresponding to a state of the finger moved by the driving unit. The method includes causing the finger to hold a workpiece, causing the robot body to start a predetermined operation while causing the finger to keep holding the workpiece, if a detected value based on the signal outputted from the detection unit is within a first range, and causing the robot body to continue to perform the predetermined operation until completion of the predetermined operation, if the detected value is within a second range in the predetermined operation. The second range is different from the first range.

36 Claims, 12 Drawing Sheets

(56) References Cited

U.S. PATENT DOCUMENTS

| | | | |
|---|---|---|---|
| 2015/0105907 A1* | 4/2015 | Aiso | B25J 9/1633 |
| | | | 901/47 |
| 2015/0120058 A1* | 4/2015 | Karito | B25J 9/1612 |
| | | | 901/9 |
| 2017/0312921 A1* | 11/2017 | Kobayashi | B25J 9/1687 |
| 2018/0126551 A1 | 5/2018 | Amano et al. | |
| 2018/0222049 A1 | 8/2018 | Suzuki et al. | |
| 2019/0176326 A1* | 6/2019 | Bingham | B25J 9/161 |

* cited by examiner

| NUMBER | GENERAL SETTING | | | | J1 SETTING | | | J2 SETTING | | |
|---|---|---|---|---|---|---|---|---|---|---|
| | CONTENTS OF CONTROL | | HOLD PATTERN | SWITCHING CONDITION | Xref1 [mm] | Ea1 [μm] | Eb1 [μm] | Xref2 [mm] | Ea2 [μm] | Eb2 [μm] |
| | J1 | J2 | | | | | | | | |
| 1 | P | P | G1 | A | 0 | 10 | 20 | 20 | 10 | 20 |
| 2 | P | P | G1 | B | 20 | 5 | 100 | 20 | 10 | 20 |
| ... | | | | | | | | | | |

FIG.9

| | GENERAL SETTING | | | | J1 SETTING | | J2 SETTING | |
|---|---|---|---|---|---|---|---|---|
| NUMBER | CONTENTS OF CONTROL | | HOLD PATTERN | SWITCHING CONDITION | Xref1 [mm] | Ea1 [μm] | Xref2 [mm] | Ea2 [μm] |
| | J1 | J2 | | | | | | |
| 3 | P | P | G1 | C | 0 | 10 | 20 | 10 |
| 4 | P | P | G1 | B | 20 | 5 | 20 | 10 |
| ... | | | | | | | | |

| GENERAL SETTING | | | | | J1 SETTING | | | | J2 SETTING |
|---|---|---|---|---|---|---|---|---|---|
| NUMBER | CONTENTS OF CONTROL | | HOLD PATTERN | SWITCHING CONDITION | Xref1 [mm] | Fref1 [N] | Ec1 [N] | Ed1 [N] | Xref2 [mm] |
| | J1 | J2 | | | | | | | |
| 5 | P | P | G1 | A | 0 | - | - | - | 20 |
| 6 | F | P | G1 | B | - | 10 | 2 | 5 | 20 |
| ... | | | | | | | | | |

METHOD OF CONTROLLING ROBOT BODY, METHOD OF MANUFACTURING PRODUCT, ROBOT APPARATUS, AND RECORDING MEDIUM

BACKGROUND OF THE INVENTION

Field of the Invention

The present invention relates to control for a robot body.

Description of the Related Art

Products such as cameras and printers are increasingly required to be automatically assembled by robots. When a product is assembled by a robot, fingers of the robot are positioned at a target position so as to stably hold a workpiece. Japanese Patent Application Publication No. 2014-46449 discloses a technique on holding operation. This technique causes an encoder value from a rotary encoder disposed in a motor of a joint to converge into an allowable error range, and completes the holding operation when the encoder value converges into the allowable error range.

However, although describing the operation for causing the fingers to accurately hold a workpiece, Japanese Patent Application Publication No. 2014-46449 fails to specifically describe an operation of the robot performed after the holding operation. For example, Japanese Patent Application Publication No. 2014-46449 fails to specifically describe how to control the fingers when the workpiece held by the fingers is assembled to a target object. In recent years, parts of products manufactured by robots are small precision parts with a variety of shapes and materials. In addition, since the robots are required to serve as a multi-skilled worker, fingers of each robot are required to hold workpieces with a variety of shapes and sizes. Under such a circumstance, robots are required to perform product-manufacturing operations, including assembly operations, at high speed and with high accuracy.

SUMMARY OF THE INVENTION

According to a first aspect of the present invention, a method includes controlling a robot body performed by a controller. The robot body includes a finger, a driving unit, and a detection unit. The driving unit is configured to move the finger. The detection unit is configured to output a signal corresponding to a state of the finger moved by the driving unit. The method includes causing the finger to hold a workpiece, causing the robot body to start a predetermined operation while causing the finger to keep holding the workpiece, if a detected value based on the signal outputted from the detection unit is within a first range, and causing the robot body to continue to perform the predetermined operation until completion of the predetermined operation, if the detected value is within a second range in the predetermined operation. The second range is different from the first range.

According to a second aspect of the present invention, a method includes manufacturing a product by using a robot body. The robot body is controlled by a controller. The robot body includes a finger, a driving unit, and a detection unit. The driving unit is configured to move the finger. The detection unit is configured to output a signal corresponding to a state of the finger moved by the driving unit. The method includes causing the finger to hold a workpiece, causing the robot body to start an assembly operation for the workpiece while causing the finger to keep holding the workpiece, if a detected value based on the signal outputted from the detection unit is within a first range, and causing the robot body to continue to perform the assembly operation until completion of the assembly operation, if the detected value is within a second range in the assembly operation. The second range is different from the first range.

According to a third aspect of the present invention, a robot apparatus includes a robot body and a controller configured to control the robot body. The robot body includes a finger, a driving unit, and a detection unit. The driving unit is configured to move the finger. The detection unit is configured to output a signal corresponding to a state of the finger moved by the driving unit. The controller is configured to cause the finger to hold a workpiece, cause the robot body to start a predetermined operation while causing the finger to keep holding the workpiece, if a detected value based on the signal outputted from the detection unit is within a first range, and cause the robot body to continue to perform the predetermined operation until completion of the predetermined operation, if the detected value is within a second range in the predetermined operation. The second range is different from the first range.

Further features of the present invention will become apparent from the following description of exemplary embodiments with reference to the attached drawings.

BRIEF DESCRIPTION OF THE DRAWINGS

FIG. 5 is an example of a table of the first embodiment.

FIG. 9 is an example of a table of a second embodiment.

FIG. 11 is an example of a table of the third embodiment.

DESCRIPTION OF THE EMBODIMENTS

Exemplary embodiments of the present invention will be described below in detail with reference to drawings.

First Embodiment

Figure 1:
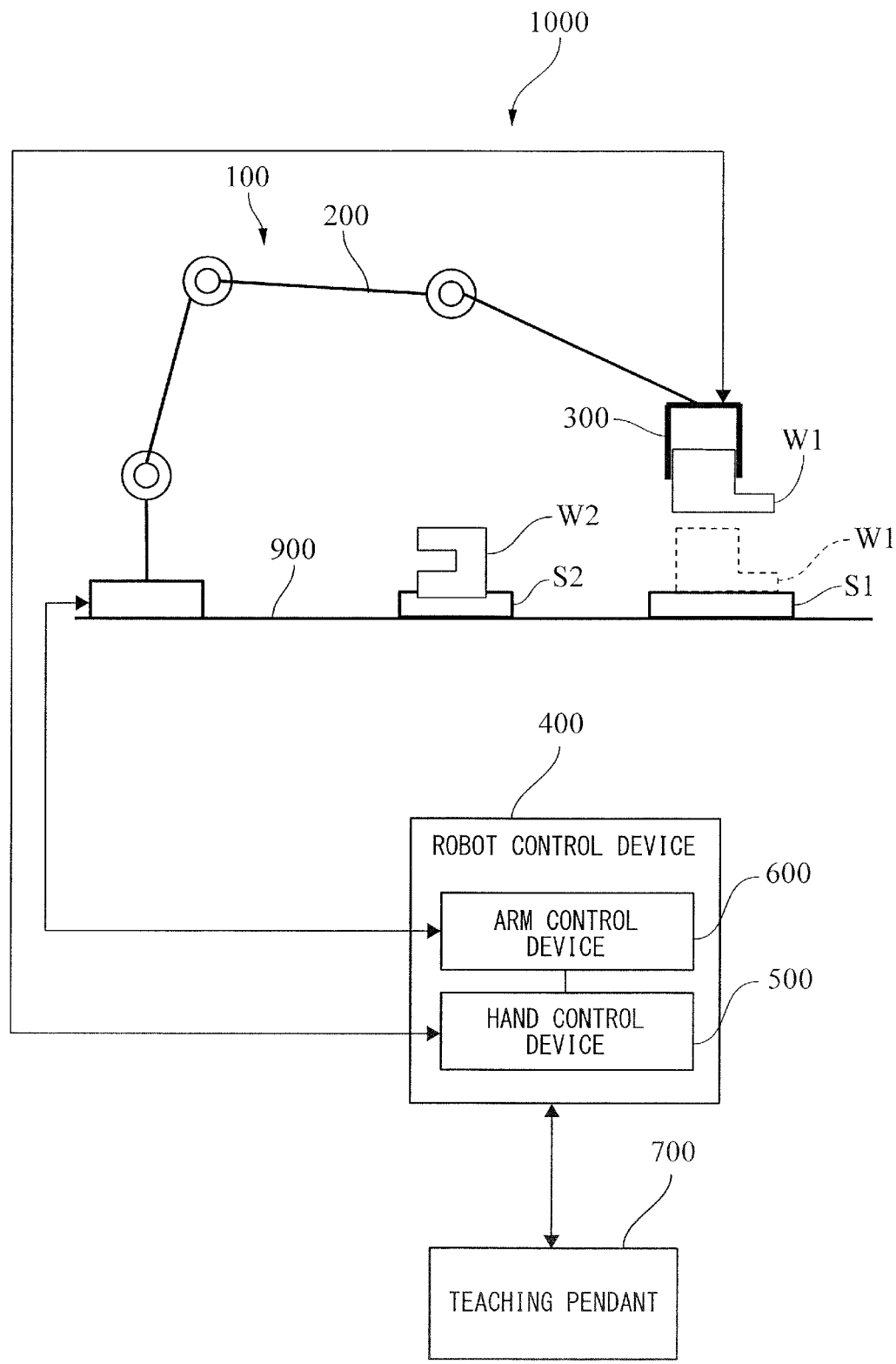
FIG. 1 is a diagram illustrating a robot apparatus of a first embodiment.

FIG. 1 is a diagram illustrating a robot apparatus of a first embodiment. A robot apparatus 1000 illustrated in FIG. 1 includes a robot body 100 and a robot control device 400. The robot control device 400 is an example of a controller to control the robot body 100. The robot body 100 is an industrial robot. The robot body 100 is disposed on a base 900. The robot body 100 includes a robot arm 200 and a robot hand 300. The robot hand 300 is attached to the robot arm 200. The robot control device 400 can be connected with a teaching pendant 700. The teaching pendant 700 is an example of a teaching device used to teach the operation of the robot body 100. On the base 900, a base S1 and a base S2 are disposed. The base S1 is a base on which a workpiece W1, such as a part, is placed; and the base S2 is a base to which another workpiece W2 is fixed. The workpiece W2 is a target object to which the workpiece W1 will be assembled. In the present embodiment, the workpiece W1 has a convex portion, and the workpiece W2 has a concave portion that the convex portion of the workpiece W1 will fit in.

The robot control device 400 controls the robot body 100, and causes the robot hand 300 of the robot body 100 to hold the workpiece W1 placed on the base S1. After causing the robot hand 300 to hold the workpiece W1, the robot control device 400 controls the robot body 100, and causes the robot body 100 to perform a predetermined operation for manufacturing products. As the predetermined operation, the robot control device 400 causes the robot body 100 to assemble the workpiece W1 to the workpiece W2. The robot control device 400 includes an arm control device 600 to control the robot arm 200, and a hand control device 500 to control the robot hand 300. The arm control device 600 and the hand control device 500 communicate with each other to control the robot body 100 as a whole.

The robot arm 200 is a vertically articulated robot arm, and includes a plurality of links linked via a plurality of joints. A link on a base end side of the robot arm 200 is fixed to the base 900. A link on a distal end side of the robot arm 200 is provided with the robot hand 300. In each joint, a motor (not illustrated) and a rotary encoder (not illustrated) are disposed. The motor is a driving source, and the rotary encoder outputs a signal corresponding to an amount of rotation of the rotary shaft of the motor, to the arm control device 600. The arm control device 600 feedback-controls the motor based on a value detected by the rotary encoder, and thereby controls the posture of the robot arm 200 so that the robot hand 300 moves to a target position. With this operation, the robot hand 300 can move to a position at which the robot hand 300 holds the workpiece W1, or to a position at which the robot hand 300 assembles the workpiece W1 to the workpiece W2.

Figure 2:
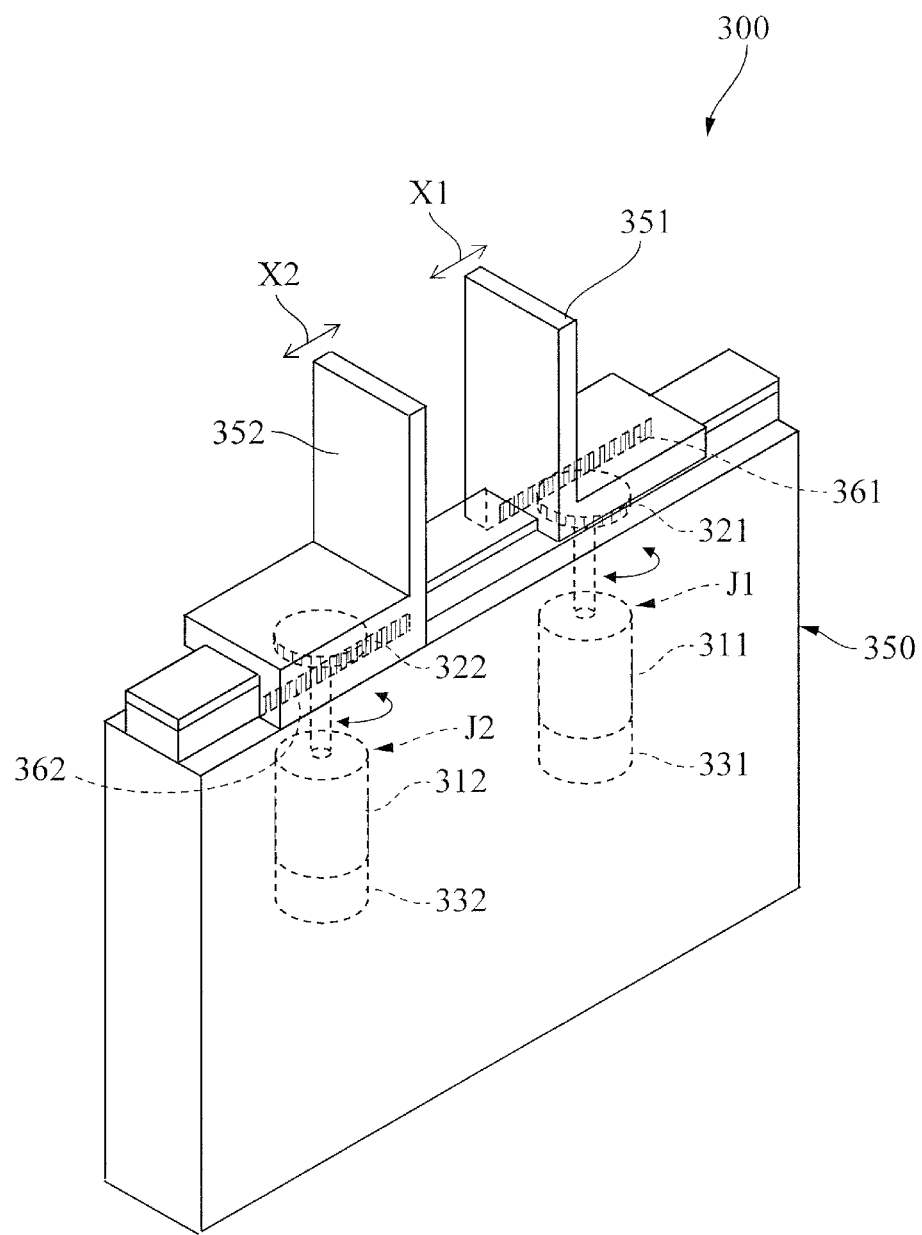
FIG. 2 is a perspective view of a robot hand of the first embodiment.

FIG. 2 is a perspective view of the robot hand 300 of the first embodiment. The robot hand 300 includes a hand body 350 and a plurality of, two for example, fingers 351 and 352. The fingers 351 and 352 are supported by the hand body 350 such that the fingers 351 and 352 can open and close.

The hand body 350 includes a driving mechanism J1 and a driving mechanism J2. The driving mechanism J1 is an example of a driving unit to drive the finger 351, and the driving mechanism J2 is an example of a driving unit to drive the finger 352. The fingers 351 and 352 are used to hold the workpiece W1 of FIG. 1, for example. Hereinafter, as one example, the description will be made for a case where the fingers 351 and 352 hold the workpiece W1. The driving mechanism J1 includes a motor 311, and a pinion gear 321 fixed to the rotary shaft of the motor 311. The finger 351 includes a rack 361 that meshes with the pinion gear 321. The driving mechanism J2 includes a motor 312, and a pinion gear 322 fixed to the rotary shaft of the motor 312. The finger 352 includes a rack 362 that meshes with the pinion gear 322.

When the rotary shaft of the motor 311 rotates, the pinion gear 321 rotates, and the rack 361 that meshes with the pinion gear 321 moves linearly in an X1 direction. That is, the finger 351 moves linearly in the X1 direction. In addition, when the rotary shaft of the motor 312 rotates, the pinion gear 322 rotates, and the rack 362 that meshes with the pinion gear 322 moves linearly in an X2 direction, which is parallel with the X1 direction. That is, the finger 352 moves linearly in the X2 direction. The workpiece can be held by the fingers 351 and 352 when the fingers 351 and 352 move close to each other, and released from the fingers 351 and 352 when the fingers 351 and 352 move away from each other. The fingers 351 and 352 move close to each other when holding the outer surface of the workpiece, and move away from each other when releasing the workpiece. In a case where the fingers 351 and 352 hold the inner surface of a ring-shaped workpiece for example, the fingers 351 and 352 move away from each other when holding the workpiece, and move close to each other when releasing the workpiece. Thus, a direction in which the fingers 351 and 352 are driven for holding the inner surface of the workpiece is different from a direction in which the fingers 351 and 352 are driven for holding the outer surface of the workpiece.

The motor 311 is provided with a rotary encoder 331 that is an example of a detection unit, and the motor 312 is provided with a rotary encoder 332 that is an example of a detection unit. The rotary encoder 331 is a sensor that outputs a signal corresponding to a state of the finger 351 moved by the driving mechanism J1. The rotary encoder 332 is a sensor that outputs a signal corresponding to a state of the finger 352 moved by the driving mechanism J2. Specifically, the rotary encoder 331 outputs a signal corresponding to an amount of rotation of the rotary shaft of the motor 311, to the hand control device 500. The rotary encoder 332 outputs a signal corresponding to an amount of rotation of the rotary shaft of the motor 312, to the hand control device 500. The rotary encoder 331 is an incremental or absolute encoder, and the rotary encoder 332 is an incremental or absolute encoder.

Figure 3:
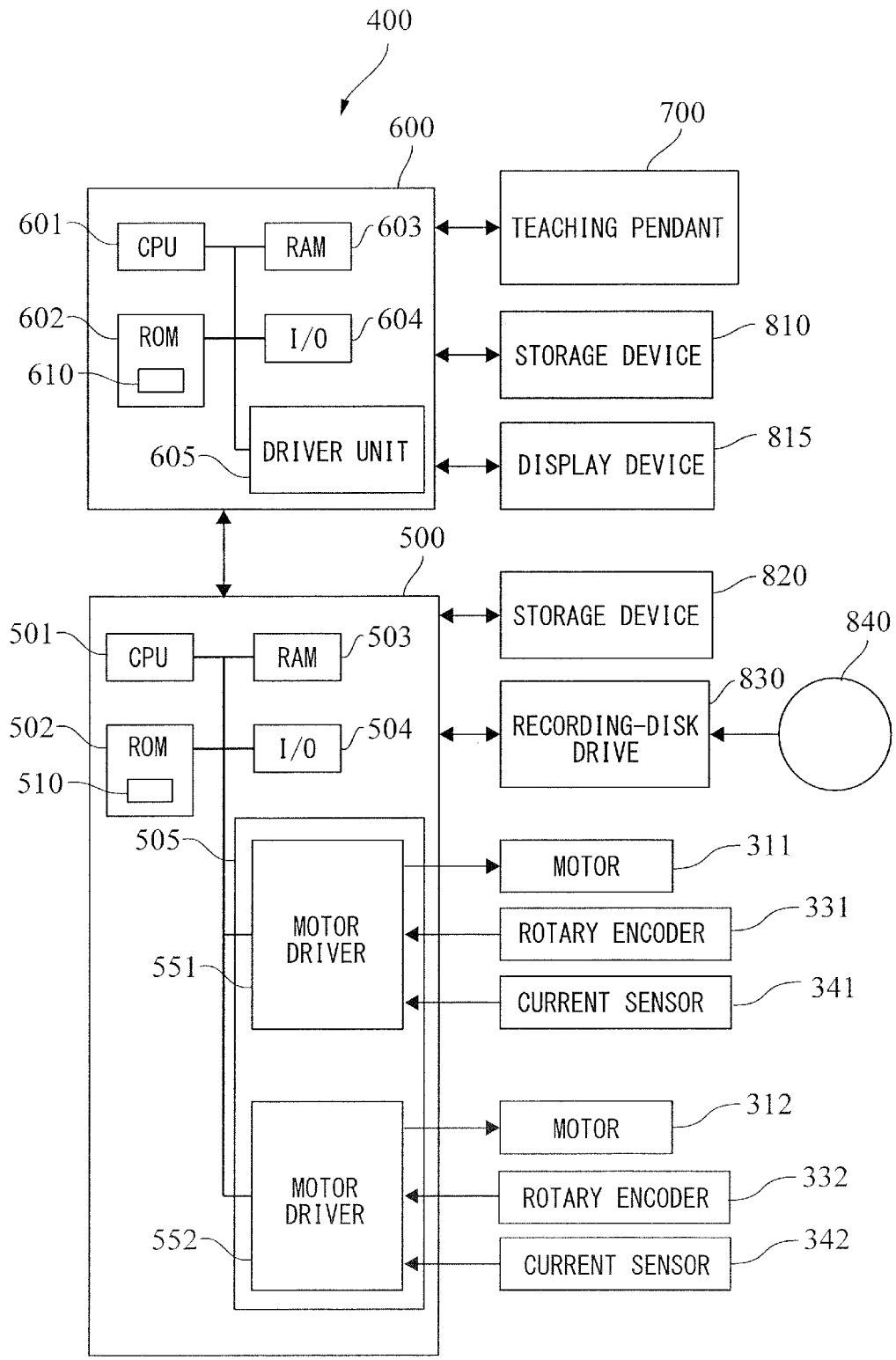
FIG. 3 is a block diagram of a control system of the robot apparatus of the first embodiment.

FIG. 3 is a block diagram illustrating the control system of the robot apparatus of the first embodiment. The robot control device 400 is a computer. Hereinafter, one example of configurations of the robot control device 400 will be described. In the present embodiment, the robot control device 400 includes the arm control device 600 and the hand control device 500. The arm control device 600 and the hand control device 500 are separate computers.

The arm control device 600 includes a central processing unit (CPU) 601, which is a processor. The arm control device 600 also includes a read only memory (ROM) 602, and a random access memory (RAM) 603, which are examples of storage units. The arm control device 600 also includes an input/output interface (I/O) 604 and a driver unit 605. The CPU 601, the ROM 602, the RAM 603, the I/O 604, and the driver unit 605 are communicatively connected with each other via a bus.

The ROM 602 stores a program 610 that causes the CPU 601 to perform various computing processes. The RAM 603 is a memory to temporarily store various data, such as results in a computing process performed by the CPU 601. The I/O 604 can be connected with the hand control device 500, the teaching pendant 700, a storage device 810 that is a data rewritable storage, and a display device 815 serving as an information providing unit. The display device 815 displays images. The storage device 810 may be included in the arm control device 600. The driver unit 605 receives a signal fed back from the rotary encoder (not illustrated); adjusts the current supplied to the motor of each joint of the robot arm 200 of FIG. 1, depending on a command from the CPU 601; and thereby controls the motion of the robot arm 200.

The storage device 810 stores a robot program created through teaching. The CPU 601 reads the robot program from the storage device 810, interprets the robot program, and thereby creates trajectory data for the robot body 100. The CPU 601 uses the trajectory data, creates a command indicating a target value used for the feedback control for the motor of each joint of the robot arm 200, and sends the command to the driver unit 605. If the trajectory data contains a command for the robot hand 300, then the CPU 601 sends data indicating a hold command number, to the hand control device 500.

The hand control device 500 includes a CPU 501 that is a processor, a ROM 502 and a RAM 503 that are examples of storage units, an I/O 504 that is an input/output interface, and a driver unit 505. The CPU 501, the ROM 502, the RAM 503, the I/O 504, and the driver unit 505 are communicatively connected with each other via a bus.

The ROM 502 stores a program 510 that causes the CPU 501 to perform various computing processes. The RAM 503 is a memory to temporarily store various data, such as results in a computing process performed by the CPU 501. The I/O 504 can be connected with the arm control device 600, a storage device 820 that is a data rewritable storage, a recording-disk drive 830, and the like. The storage device 820 may be included in the hand control device 500. The driver unit 505 includes a motor driver 551 that drives the motor 311, and a motor driver 552 that drives the motor 312.

The motor driver 551 is electrically connected with the motor 311, the rotary encoder 331 that is an example of a detection unit, and a current sensor 341 that is an example of a detection unit. The rotary encoder 331 is a position detection unit that outputs a signal corresponding to a position of the finger 351. The current sensor 341 is a current detection unit that outputs a signal corresponding to the current that flows in the motor 311. The motor driver 551 performs position control for the finger 351 by using the rotary encoder 331, and force control for the finger 351 by using the current sensor 341. The position control and the force control are examples of feedback control. The rotary encoder 331 outputs a signal corresponding to the amount of rotation of the rotary shaft of the motor 311, to the motor driver 551. The current sensor 341 outputs a signal corresponding to the current supplied to the motor 311, to the motor driver 551. The motor driver 551 counts the number of pulses of the signal sent from the rotary encoder 331, and thereby determines a detected encoder value, which is an example of a detected value. The detected encoder value is a value corresponding to a position of the finger 351. In addition, the motor driver 551 detects a voltage level of the signal sent from the current sensor 341, and thereby determines a detected current value, which is an example of a detected value. The detected current value is a value corresponding to the force applied to the finger 351. The motor driver 551 adjusts the current supplied to the motor 311, based on a difference between a detected value and a target value; and thereby feedback-controls the motor 311 for making the detected value closer to the target value. Specifically, when the CPU 501 instructs the motor driver 551 to perform the position control, the motor driver 551 feedback-controls the motor 311 based on a difference between a detected encoder value and a target encoder value sent from the CPU 501. The target encoder value is an example of a target value. When the CPU 501 instructs the motor driver 551 to perform the force control, the motor driver 551 feedback-controls the motor 311 based on a difference between a detected current value and a target current value sent from the CPU 501. The target current value is an example of a target value.

The motor driver 552 is electrically connected with the motor 312, the rotary encoder 332 that is an example of a detection unit, and a current sensor 342 that is an example of a detection unit. The rotary encoder 332 is a position detection unit that outputs a signal corresponding to a position of the finger 352. The current sensor 342 is a current detection unit that outputs a signal corresponding to the current that flows in the motor 312. The motor driver 552 performs position control for the finger 352 by using the rotary encoder 332, and force control for the finger 352 by using the current sensor 342. The position control and the force control are examples of feedback control. Since the motor driver 552 performs the same operation as that of the motor driver 551, the detailed description thereof will be omitted.

The recording-disk drive 830 can read various types of data and a program stored in a recording disk 840. In the present embodiment, the ROMs 502 and 602 are computer-readable non-transitory recording media, and stores the programs 510 and 610. However, the present disclosure is not limited to this. The programs 510 and 610 may be recorded in any recording medium as long as the recording medium is a computer-readable recording medium. For example, the recording medium that supplies the programs 510 and 610 may be the recording disk 840. Specifically, a flexible disk, a hard disk, an optical disk, a magneto-optical disk, a magnetic tape, a nonvolatile memory, or the like may be used as the recording medium. The optical disk may be a DVD-ROM, a CD-ROM, or a CD-R. The nonvolatile memory may be a USB memory, a memory card, or a ROM.

Figure 4:
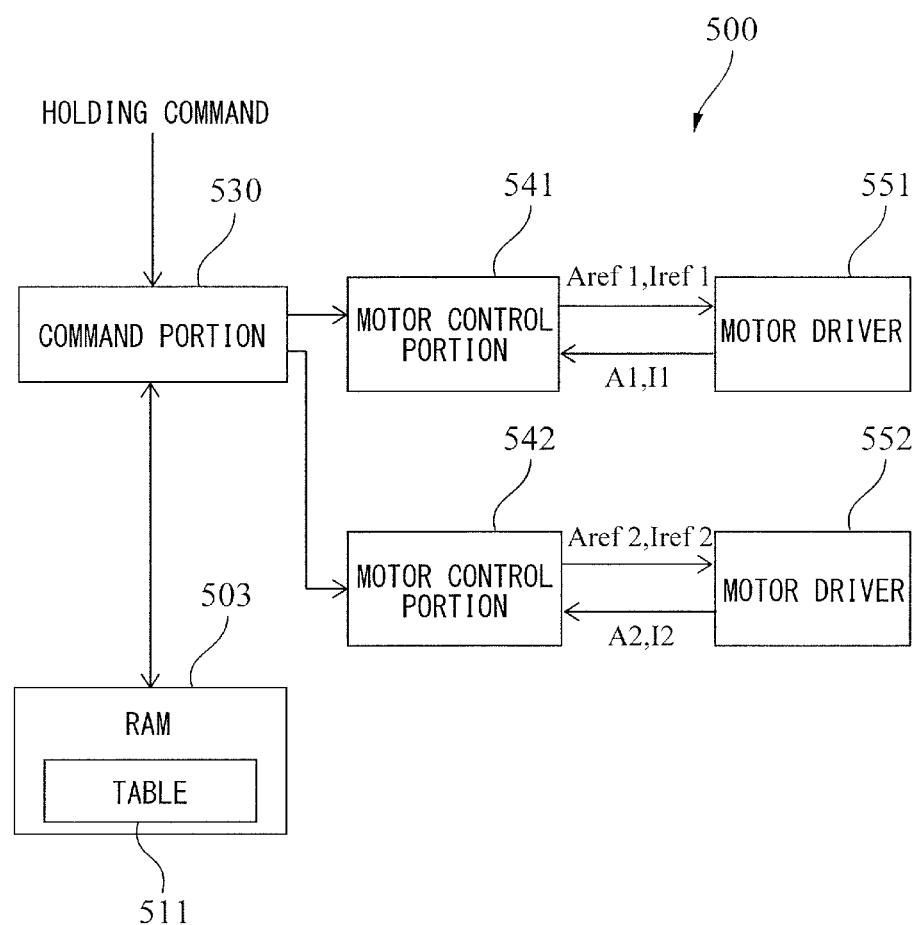
FIG. 4 is a functional block diagram of a hand control device of the first embodiment.

FIG. 4 is a functional block diagram of the hand control device 500 of the first embodiment. When executing the program 510, the CPU 501 illustrated in FIG. 3 functions as a command portion 530, a motor control portion 541, and a motor control portion 542, as illustrated in FIG. 4.

The RAM 503 stores a table 511 having been read from the storage device 820 of FIG. 3. For example, the table 511 is created by an operator when the robot body 100 is taught, and is stored in the storage device 820 in advance. Alternatively, the table 511 may be obtained from an external computer. The command portion 530 refers to the table 511 stored in the RAM 503; and determines various parameters, depending on a hold command sent from the arm control device 600 of FIG. 3. The parameters are used for controlling the motors 311 and 312, which drive the fingers 351 and 352. The command portion 530 outputs the determined parameters to the motor control units 541 and 542. The motor control portion 541 determines a target value based on the parameters sent from the command portion 530; and outputs a control signal indicating the target value, to the motor driver 551. The motor control portion 542 determines a target value based on the parameters sent from the command portion 530; and outputs a control signal indicating the target value, to the motor driver 552. The motor driver 551 feedback-controls the motor 311 for making a detected value closer to the target value, based on a difference between the target value and the detected value that has been fed back. The motor driver 552 feedback-controls the motor 312 for making a detected value closer to the target value, based on a difference between the target value and the detected value that has been fed back.

The robot control device 400 can perform the position control or the force control on the motors 311 and 312. When performing the position control, the motor control portion 541 outputs a target encoder value Aref1 as a target value to the motor driver 551, and the motor control portion 542 outputs a target encoder value Aref2 as a target value to the motor driver 552. The motor driver 551 determines a difference between the target encoder value Aref1 and a detected encoder value A1 obtained from a signal from the rotary encoder 331, and feedback-controls the motor 311 based on the difference. The motor driver 552 determines a difference between the target encoder value Aref2 and a detected encoder value A2 obtained from a signal from the rotary encoder 332, and feedback-controls the motor 312 based on the difference. The motor driver 551 outputs the detected encoder value A1 to the motor control portion 541, and the motor driver 552 outputs the detected encoder value A2 to the motor control portion 542. When performing the force control, the motor control units 541 outputs a target current value Iref1 as a target value to the motor driver 551, and the motor control portion 542 outputs a target current value Iref2 as a target value to the motor driver 552. The motor driver 551 determines a difference between the target current value Iref1 and a detected current value I1 obtained from a signal from the current sensor 341, and feedback-controls the motor 311 based on the difference. The motor driver 552 determines a difference between the target current value Iref2 and a detected current value I2 obtained from a signal from the current sensor 342, and feedback-controls the motor 312 based on the difference. The motor driver 551 outputs the detected current value I1 to the motor control portion 541, and the motor driver 552 outputs the detected current value I2 to the motor control portion 542.

Hereinafter, the table 511 will be specifically described for a case where the position control is performed on the motors 311 and 312. FIG. 5 illustrates the table 511 of the first embodiment, as one example. In the table 511, as general setting for controlling the robot hand 300, the hold command number is associated with the contents of control, the hold pattern, and the switching condition. In addition, as setting for controlling the driving mechanism J1, the hold command number is associated with a target position Xref1 of the finger 351, a width Ea1 for the target position Xref1, and another width Eb1 for the target position Xref1. In addition, as setting for controlling the driving mechanism J2, the hold command number is associated with a target position Xref2 of the finger 352, a width Ea2 for the target position Xref2, and another width Eb2 for the target position Xref2.

The contents of control indicate which of the position control and the force control is performed on each of the driving mechanisms J1 and J2. The position control is feedback control that makes the position of the finger closer to the target position. The force control is feedback control that makes the force applied to the finger closer to the target force. In FIG. 5, the position control is denoted by P, and the force control is denoted by F. The control of P or F is set for each of the driving mechanisms J1 and J2. Preferably, patterns in combination of the position control and the force control are two types of PP and FP. The pattern PP indicates that the position control is performed on all the motors of the driving mechanisms J1 and J2. The pattern FP indicates that the force control is performed on the motor of the driving mechanism J1, and the position control is performed on the motor of the driving mechanism J2.

The hold pattern has two patterns: a pattern G1 in which the fingers 351 and 352 will hold the outer surface of a workpiece, and a pattern G2 in which the fingers 351 and 352 will hold the inner surface of the workpiece.

The switching condition is used to switch the widths from Ea1 and Ea2 to Eb1 and Eb2 in the position control for the fingers; and in the present embodiment, includes a condition A and a condition B. The condition A specifies that the widths are switched when a predetermined time (for example, zero seconds) has elapsed from when the positioning of the fingers was completed. The condition B specifies that the widths are switched when the hand control device 500 receives a switching signal from the arm control device 600. In the condition B, the arm control device 600 interprets the robot program, and determines the timing at which the arm control device 600 sends the switching signal to the hand control device 500. For example, the arm control device 600 sends the switching signal to the hand control device 500 when the workpiece is conveyed or assembled to another workpiece.

The target position Xref1 corresponds to the amount of movement of the finger 351 with respect to a reference position, and the target position Xref2 corresponds to the amount of movement of the finger 352 with respect to a reference position. The width Ea1 is used to determine whether the positioning of the finger 351 for the target position Xref1 is completed, and the width Ea2 is used to determine whether the positioning of the finger 352 for the target position Xref2 is completed. Specifically, in a case where the workpiece W1 is held by the fingers 351 and 352, the positioning of the finger 351 is completed when the finger 351 is located within a range of Xref1±Ea1, and the positioning of the finger 352 is completed when the finger 352 is located within a range of Xref2±Ea2. Hereinafter, the range of Xref1±Ea1 and the range of Xref2±Ea2 are referred to also as a completion range. The completion range Xref1±Ea1 includes the target position Xref1, and the completion range Xref2±Ea2 includes the target position Xref2. For example, when the target position Xref1 of the finger 351 is 20 mm, and the width Ea1 is 5 μm, the completion range of the finger 351 is 20±0.005 mm. That is, when the position of the finger 351, converted from a detected encoder value of the motor 311, is in a range from 19.995 to 20.005 mm, the positioning of the finger 351 is completed. Alternatively, the positioning of the finger 351 may be completed when the position of the finger 351 has been within the completion range for a predetermined time. The same holds true for the finger 352.

The width Eb1 is an allowable width in which the finger 351 can vary after the positioning of the finger 351 and during a predetermined operation of the robot body 100, such as an operation performed when the workpiece W1 is assembled to the workpiece W2. The width Eb2 is an allowable width in which the finger 352 can vary after the positioning of the finger 352 and during the predetermined operation of the robot body 100. Thus, when the workpiece W1 held by the fingers 351 and 352 is assembled to the workpiece W2, the range of Xref1±Eb1 is allowed for the finger 351, and the range of Xref2±Eb2 is allowed for the finger 352. Hereinafter, the range of Xref1±Eb1 and the range of Xref2±Eb2 are referred to also as an allowable range. The allowable range Xref1±Eb1 includes the target position Xref1, and the allowable range Xref2±Eb2 includes the target position Xref2. The allowable range Xref1±Eb1 is different from the completion range Xref1±Ea1, and the allowable range Xref2±Eb2 is different from the completion range Xref2±Ea2. For example, when the target position Xref1 of the finger 351 is 20 mm, and the width Eb1 is 100 the allowable range of the finger 351 is 20±0.1 mm. That is, when the position of the finger 351, converted from a detected encoder value of the motor 311, is in an allowable range from 19.9 to 20.1 mm, the robot control device 400 causes the robot body 100 to continue the assembly operation of the robot body 100. In contrast, when the position of the finger 351 is out of the allowable range from 19.9 to 20.1 mm, the robot control device 400 stops the motion of the robot body 100, as an error.

Upon receiving a hold command from the arm control device 600, the command portion 530 of FIG. 4 refers to the table 511, and sends information data on the contents of control (P or F), the target position Xref1, the width Ea1, and the width Eb1 associated with the hold command number, to the motor control portion 541. Similarly, the command portion 530 refers to the table 511, and sends information data on the contents of control (P or F), the target position Xref2, the width Ea2, and the width Eb2 associated with the hold command number sent from the arm control device 600, to the motor control portion 542.

Figure 6:
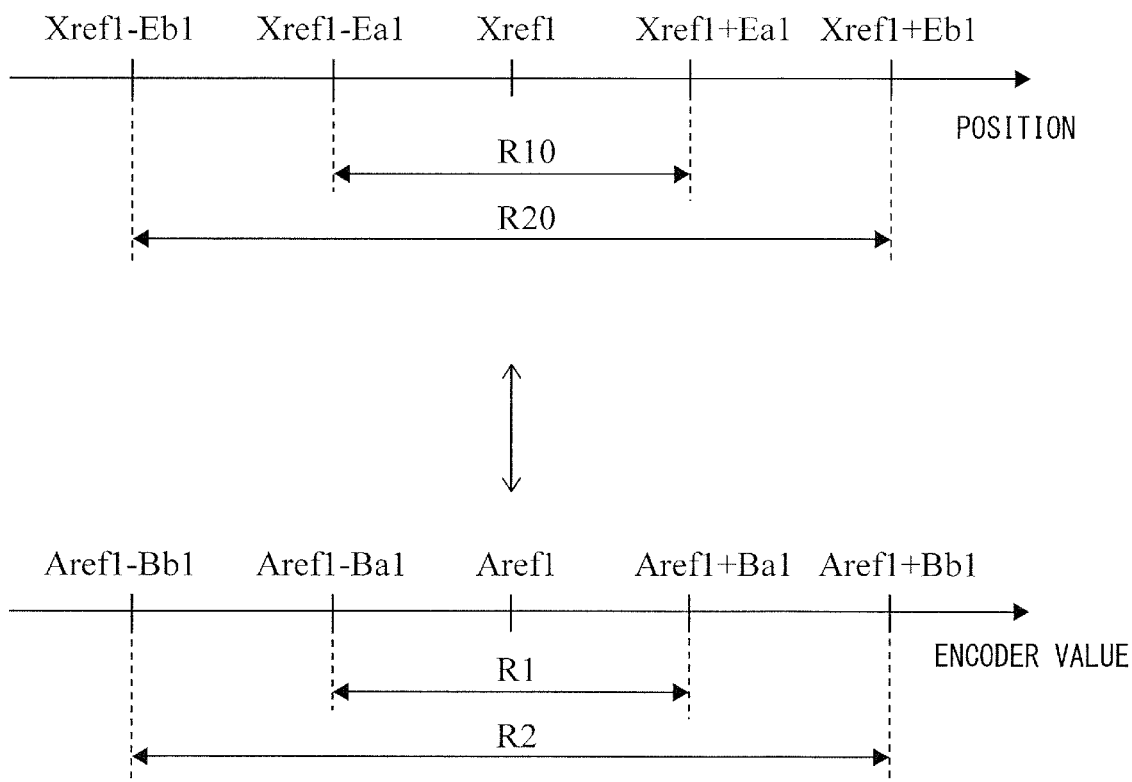
FIG. 6 is a diagram for illustrating a process of a motor control unit of the first embodiment.

FIG. 6 is a diagram for illustrating a process of the motor control portion 541 of the first embodiment. When the contents of control sent from the command portion 530 is P, the motor control portion 541 converts the target position Xref1 of the finger 351 to a target encoder value Aref1. The target encoder value Aref1 is a target value to be sent to the motor driver 551. The motor control portion 541 then outputs the target encoder value Aref1 to the motor driver 551. Upon receiving the target encoder value Aref1, the motor driver 551 feedback-controls the motor 311 based on the difference between the detected encoder value A1 and the target encoder value Aref1. When causing the fingers to hold the workpiece W1, the motor control portion 541 determines whether a position value converted from the detected encoder value A1 is within a completion range R10 that is the range of Xref1±Ea1. When causing the fingers to assemble the workpiece W1 to the workpiece W2, the motor control portion 541 determines whether a position value converted from the detected encoder value A1 is within an allowable range R20 that is the range of Xref1±Eb1, which is different from the completion range R10. In the present embodiment, the allowable range R20 includes the completion range R10, and is wider than the completion range R10. Since the motor control portion 542 performs the same operation as that of the motor control portion 541, the description thereof will be omitted.

Here, the encoder value converted from the width Ea1 is denoted by a width Ba1, and the encoder value converted from the width Eb1 is denoted by a width Bb1. Thus, the completion range R10 that is the range of Xref1±Ea1 corresponds to a range R1 that is a range of Aref1±Ba1. The range R1 is a first range. In addition, the allowable range R20 that is the range of Xref1±Eb1 corresponds to a range R2 that is a range of Aref1±Bb1. The range R2 is a second range. Thus, the process to determine whether the position value of the finger 351 converted from the detected encoder value is within the completion range R10 is equivalent to the process to determine whether the detected encoder value is within the range R1. Similarly, the process to determine whether the position value of the finger 351 converted from the detected encoder value is within the allowable range R20 is equivalent to the process to determine whether the detected encoder value is within the range R2. In the present embodiment, the range R2 includes the range R1, and is wider than the range R1. The completion range R10, that is, the range R1 is a range that is preset through teaching or the like. The allowable range R20, that is, the range R2 is a range that is preset through teaching or the like.

Figure 7:
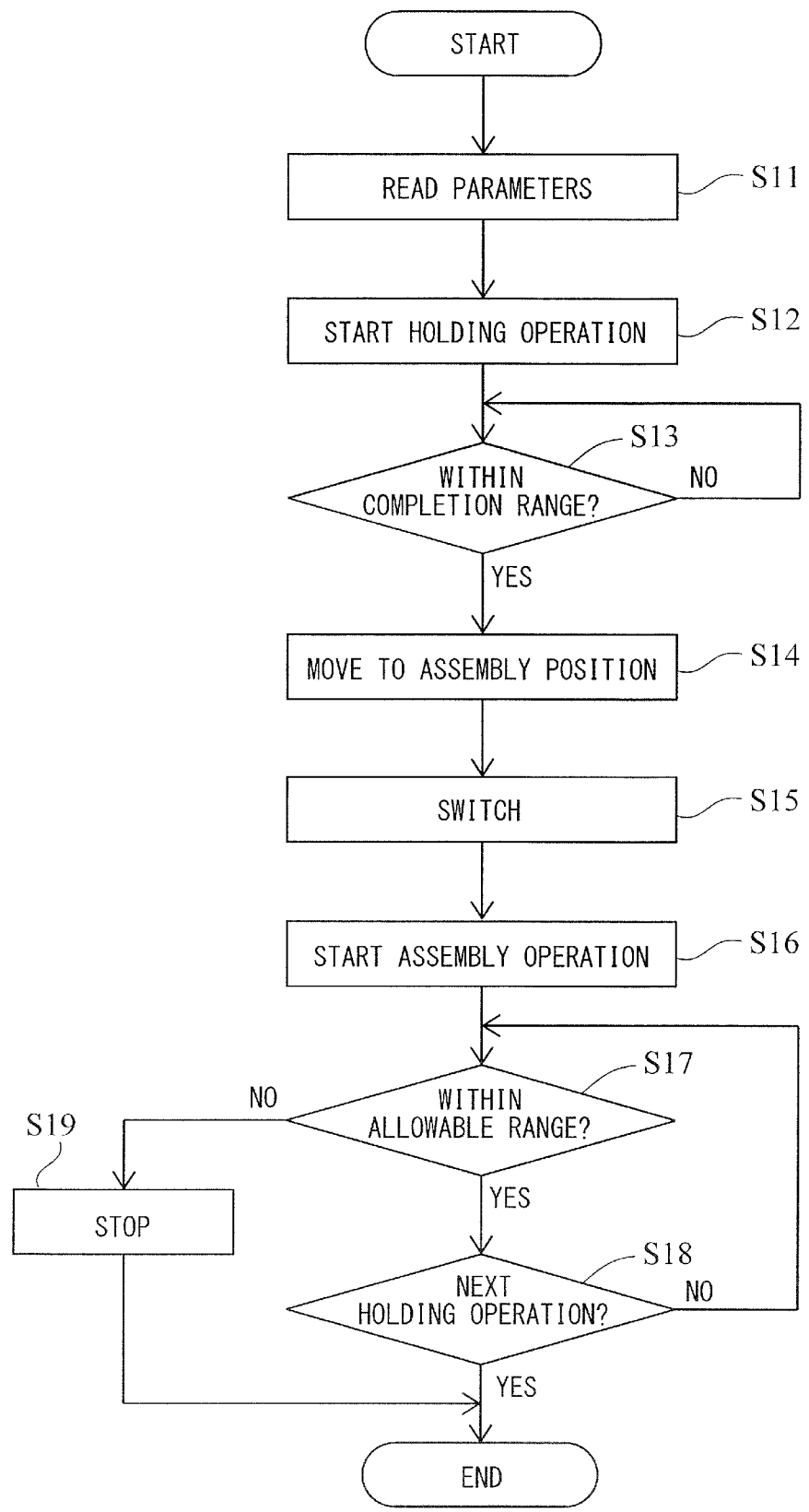
FIG. 7 is a flowchart illustrating a robot control method of the first embodiment.
Figure 8A:
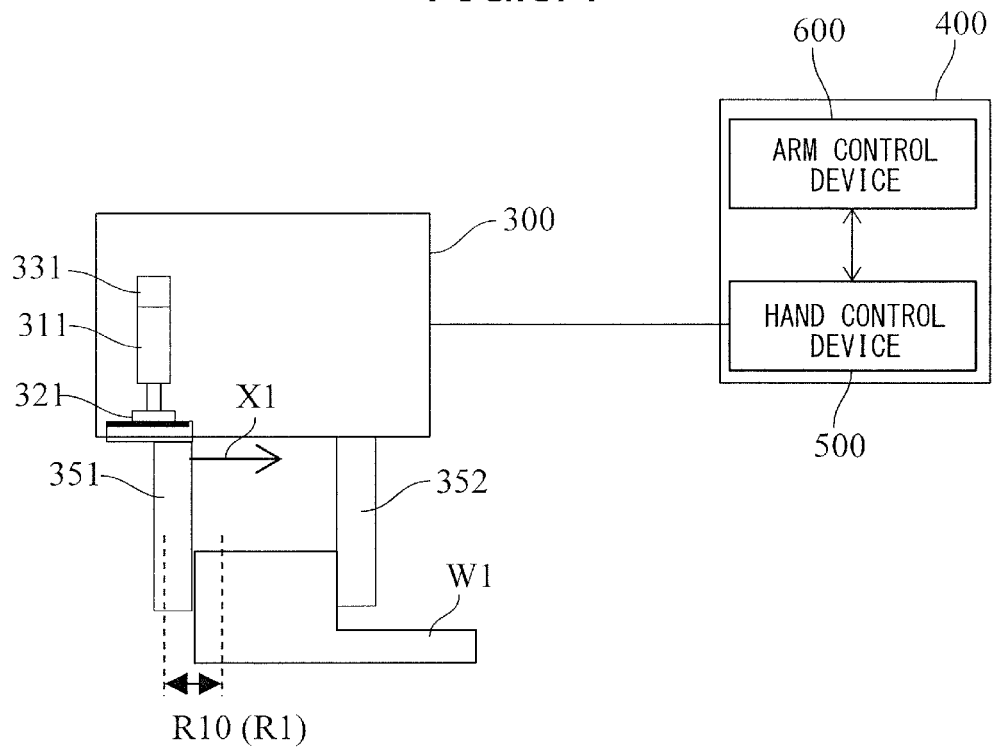
FIG. 8A is a diagram for illustrating the robot control method of the first embodiment.
Figure 8B:
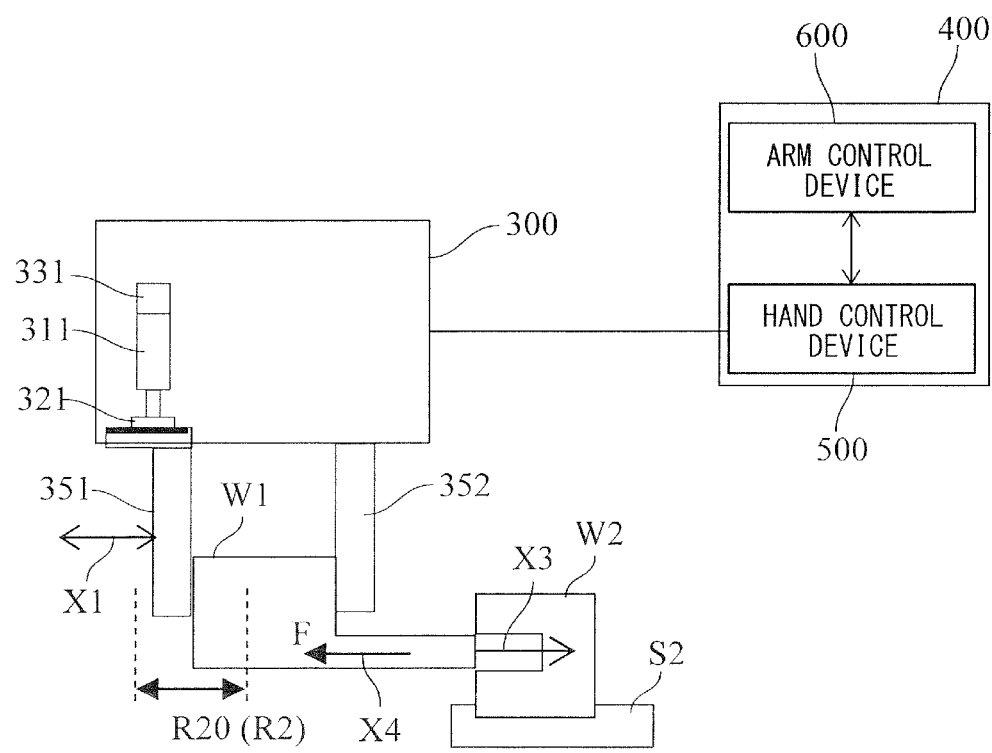
FIG. 8B is a diagram for illustrating the robot control method of the first embodiment.

A method of controlling the robot body 100 performed by the robot control device 400, that is, a method of manufacturing products by controlling the robot body 100 will be specifically described. Since the control for the driving mechanism J2 is the same as that for the driving mechanism J1, the description thereof will be omitted. Hereinafter, the description will be made for a case where the hold command number, outputted by the arm control device 600, is 2. FIG. 7 is a flowchart illustrating a robot control method of the first embodiment. FIGS. 8A and 8B are diagrams for illustrating the robot control method of the first embodiment. In the first embodiment, the operation to assemble the workpiece W1 to the workpiece W2 is an insert operation to insert the convex portion of the workpiece W1 into the concave portion of the workpiece W2. Here, the convex portion of the workpiece W1 is inserted into the concave portion of the workpiece W2 in an X3 direction. Preferably, the range R20 is wider than the range R10 in a direction X4 opposite to the direction X3. In the first embodiment, the range R20 is wider than the range R10 in the X3 direction and the X4 direction. Since the range R1 corresponds to the range R10, and the range R2 corresponds to the range R20, the range R2 is preferably wider than the range R1 in the direction X4. In the first embodiment, the range R2 is wider than the range R1 in the X3 direction and the X4 direction.

The arm control device 600 controls the motion of the robot arm 200 in accordance with the trajectory data, and moves the robot hand 300 to a position at which the robot hand 300 can hold the workpiece W1. Then the arm control device 600 outputs information data on the hold command number to the hand control device 500.

The hand control device 500 reads parameters associated with the hold command number, from the table 511 stored in the RAM 503 (S11). The parameters are information data on the contents of control, the hold pattern, the switching condition, the target positions Xref1 and Xref2 of the driving mechanisms J1 and J2, the widths Ea1 and Ea2, and the widths Eb1 and Eb2.

The hand control device 500 executes a hold command from the arm control device 600, and causes the finger 351 to start the holding operation (S12). That is, the hand control device 500 causes the finger 351 to start to hold the workpiece W1, in accordance with the parameters having been read. Specifically, the hand control device 500 feedback-controls the motor 311 based on the difference between the detected encoder value A1, corresponding to the drive state of the motor 311, and the target encoder value Aref1; and thereby causes the finger 351 to start to hold the workpiece W1. The finger 351 is driven in the X1 direction, and contacts the workpiece W1. Since the hold command number is 2, the target position Xref1 is 20 mm. Thus, the completion range R10 for positioning of the finger 351, which is the range of Xref1±Ea1, is 20 mm±5 µm.

Before a part of the convex portion of the workpiece W1 is inserted into the concave portion of the workpiece W2, the hand control device 500 controls the finger 351 based on the detected encoder value A1 detected by the rotary encoder 331 and the range R1. In the first embodiment, the hand control device 500 determines a position of the finger 351 by using the detected encoder value A1 based on a signal from the rotary encoder 331, and determines whether the position is within the completion range R10 (S13). In other words, in Step S13, the hand control device 500 determines whether the holding of the workpiece W1 is completed, based on the detected encoder value A1 detected by the rotary encoder 331 and the range R1. The hand control device 500 repeats Step S13 if the position is out of the completion range R10 (S13: NO), or proceeds to the next step S14 if the position is within the completion range R10 (S13: YES). FIG. 8A illustrates a state in which the position of the finger 351 is within the width Ea1 defined with respect to the target position Xref1. With this operation, the workpiece W1 is held by the finger with predetermined force.

Here, the determination process in Step S13 is not limited to the above-described process. For example, the hand control device 500 may determine whether the detected encoder value A1 is within the range R1 including the target encoder value Aref1, without converting the encoder value to a position of the finger. In this case, the position of the finger 351 is within the completion range R10 if the detected encoder value A1 is within the range R1, and is out of the completion range R10 if the detected encoder value A1 is out of the range R1. That is, if the detected encoder value A1 is within the range R1 including the target encoder value Aref1, the hand control device 500 proceeds to the next step S14, regardless of which determination index is used. In addition, for increasing accuracy, the hand control device 500 may proceed to the next step S14 if the position of the finger has been within the completion range for a predetermined time. Specifically, the hand control device 500 may determine that the fingers 351 and 352 have finished to hold the workpiece W1, if the detected encoder value A1 outputted from the rotary encoder 331 has been within the range R1 for a predetermined time. In contrast, the hand control device 500 may cause the fingers 351 and 352 to hold the workpiece W1 again in the holding operation, if the detected encoder value A1 outputted from the rotary encoder 331 deviates from the range R1 during a predetermined time after the detected value A1 becomes within the range R1.

With the above-described control, the workpiece W1 can be held by the fingers 351 and 352 in a state where the workpiece W1 is positioned with high accuracy. In Step S14, the hand control device 500 sends information data indicating that the holding operation has been completed, to the arm control device 600. Upon receiving the information data, the arm control device 600 moves the robot hand 300 to a predetermined position (FIG. 8B) at which the robot hand 300 starts a predetermined operation, in which the workpiece W1 held by the fingers is assembled to the workpiece W2.

When the workpiece W1 is assembled to the workpiece W2, the finger 351 holding the workpiece W1 is applied with an assembly force F, as illustrated in FIG. 8B, toward the direction X4 opposite to the direction X3. The direction X3 is a direction toward which the workpiece W1 is assembled to the workpiece W2. Thus, the assembly force F urges the finger 351 to move toward the direction X4 opposite to the direction X3. Thus, the assembly force F causes a displacement in position of the finger 351, although the motor 311 for driving the finger 351 is feedback-controlled to move the finger 351 to the target position Xref1. The displacement in position of the finger 351 hardly affects the assembly accuracy, but is inevitable when the workpiece W1 is assembled to the workpiece W2.

In the present embodiment, the hand control device 500 switches the range used to evaluate the detected value, depending on the switching condition having been read (S15). For example, when the hold command number is 2, the hand control device 500 switches the range from the Ea1 (5 μm) to the Eb1 (100 μm), depending on the switching condition B. When the arm control device 600 has moved the robot hand 300 to a position at which the robot hand 300 starts the assembly operation, the arm control device 600 outputs a signal to the hand control device 500. Since the switching condition is B when the hold command number is 2, the hand control device 500 waits until receiving a signal from the arm control device 600. Upon receiving the signal from the arm control device 600, the hand control device 500 switches the range used to evaluate the detected value, from the completion range R10 to the allowable range R20.

The arm control device 600 causes the robot body 100, or the robot arm 200, to start a predetermined operation in which the workpiece W1 is assembled to the workpiece W2 (S16). That is, after the fingers hold the workpiece W1 and the detected encoder value A1 falls into the range R1 that includes the target encoder value Aref1, the arm control device 600 causes the robot arm 200 to start to perform the assembly operation. In FIG. 8B, the arm control device 600 causes the robot arm 200 to move the workpiece W1 toward the direction X3 parallel to the direction X1, to assemble the workpiece W1 to the workpiece W2. That is, the convex portion of the workpiece W1 is inserted into the concave portion of the workpiece W2.

After the part of the convex portion of the workpiece W1 is inserted into the concave portion of the workpiece W2, the hand control device 500 controls the finger 351 based on the detected encoder value A1, which is detected by the rotary encoder 331, and the range R2. Specifically, the hand control device 500 converts the detected encoder value A1 to a position of the finger 351, and determines whether the converted value is within the allowable range R20 (S17). In other words, in Step S17, the hand control device 500 determines whether to continue to insert the workpiece W1, based on the detected encoder value A1 detected by the rotary encoder 331 and the range R2. If the position of the finger 351 is within the allowable range R20 (S17: YES), then the hand control device 500 proceeds to Step S18 because there is no error. That is, in the insert operation of inserting the workpiece W1 into the workpiece W2, the hand control device 500 causes the robot body 100 to continue to insert the workpiece W1 into the workpiece W2 until completion of the insert operation, if the detected encoder value A1 detected by the rotary encoder 331 is within the range R2. If the position of the finger 351 is out of the allowable range R20 (S17: NO), then the hand control device 500 outputs an error signal to the arm control device 600, and the arm control device 600 stops the operation of the robot body 100, that is the robot arm 200 (S19). Upon receiving the error signal, the arm control device 600 may cause the display device 815 of FIG. 3 to display an image indicating the error for informing a user of the error. In Step S18, the hand control device 500 determines whether to have received a hold command that indicates the next holding operation. If the hand control device 500 has received the next hold command (S18: YES), then the hand control device 500 ends the process performed for the current hold command, to execute the next hold command. If the hand control device 500 has not received the next hold command (S18: NO), then the hand control device 500 returns to Step S17.

Here, the determination process in Step S17 is not limited to the above-described process. For example, the hand control device 500 may determine whether the detected encoder value A1 is within the range R2, which is illustrated in FIG. 6 and includes the target encoder value Aref1, without converting the encoder value to a position of the finger. In this case, the position of the finger 351 is within the allowable range R20 if the detected encoder value A1 is within the range R2, and is out of the allowable range R20 if the detected encoder value A1 is out of the range R2. That is, if the detected encoder value A1 is within the range R2 including the target encoder value Aref1, the hand control device 500 proceeds to Step S18 regardless of which determination index is used; if the detected encoder value A1 is out of the range R2, the hand control device 500 proceeds to Step S19 regardless of which determination index is used.

As described above, after the robot control device 400 causes the robot body 100 to start the predetermined operation in which the workpiece W1 is assembled to the workpiece W2, the robot control device 400 causes the robot body 100 to perform the assembly operation until the completion of the assembly operation, as long as the detected encoder value A1 is within the range R2. In contrast, after the robot control device 400 causes the robot body 100 to start the predetermined operation, the robot control device 400 causes the robot body 100 to stop the assembly operation when the detected encoder value A1 is out of the range R2.

Thus, when the workpiece W1 is assembled to the workpiece W2, the range for evaluating the position of the finger is changed from the range R1 to the range R2. With this operation, when the workpiece W1 is assembled to the workpiece W2, false error signals are less produced. As a result, the production of products by the robot body 100 is less frequently stopped, which increases the productivity of the products. In addition, since the operation of the robot body 100 is stopped when the detected encoder value is out of the range R2, the reliability increases.

Furthermore, since the allowable range for the position of the finger 351 is widened when the workpiece W1 is assembled to the workpiece W2, the robot hand 300 can be lightened. In addition, the workpiece W1 can be assembled to the workpiece W2, with high accuracy.

Second Embodiment

Next, robot control of a second embodiment will be described. FIG. 9 is an example of a table of the second embodiment. Since the configuration of a robot apparatus of the second embodiment is the same as that of the first embodiment illustrated in FIGS. 1 to 4, the description thereof will be omitted. In the above-described first embodiment, the width Eb1, that is, the allowable range R20 (range R2) is set by an operator in advance, through teaching or the like. In the second embodiment, however, the width Eb1, that is, the allowable range R20 (range R2) is automatically set when the finger 351 performs the holding operation.

In the second embodiment, a table 511A illustrated in FIG. 9 is used instead of the table 511 illustrated in FIG. 5. The table 511A will be specifically described. Unlike the table 511 of FIG. 5, the table 511A has no item for setting the widths Eb1 and Eb2. Here, the switching condition may include a condition C. The condition C specifies that the position control is continued with the width Ea1.

A control method of the robot control device 400 will be specifically described. Since the control for the driving mechanism J2 is the same as that for the driving mechanism J1, the description thereof will be omitted. Hereinafter, the description will be made for a case where the hold command number, outputted by the arm control device 600, is 4. In the second embodiment, the switching process of Step S15 of the flowchart of FIG. 7 is different from that of the first embodiment. Hereinafter, the switching process of Step S15 will be described.

In the second embodiment, the hand control device 500 calculates the width Eb1; and switches the range used to evaluate the detected value, depending on the switching condition having been read. For example, when the hold command number is 4, the hand control device 500 calculates the width Eb1; and switches the range from the Ea1 (5 μm) to the Eb1 calculated as described below, depending on the switching condition B. When the arm control device 600 has moved the robot hand 300 to a position at which the robot hand 300 starts the assembly operation, the arm control device 600 outputs a signal to the hand control device 500. When the hold command number is 4, the switching condition is B. Thus, the hand control device 500 waits until receiving a signal from the arm control device 600. Upon receiving the signal, the hand control device 500 switches range used to evaluate the detected value, from the completion range R10 to the allowable range R20.

Hereinafter, a process to calculate the width Eb1 will be specifically described. Here, the reduction ratio of the driving mechanisms J1 and J2 is denoted by N, the torque constant of the motors 311 and 312 is denoted by $K_t$, the gear radius of the pinion gears 321 and 322 is denoted by R. By using a profile obtained when the finger 351 performs the holding operation, the stiffness between the workpiece W1 and the finger 351 is calculated, and thereby the width Eb1 can be calculated. The profile is a time history response of the detected current value I1 of the motor 311 and the detected encoder value A1. In this profile, the detected encoder value A1 obtained when the finger 351 contacts the workpiece W1 is denoted by $A1_0$. The encoder value $A1_0$ may be determined from the change of the detected current value I1. For example, the detected current value I1 obtained when the finger 351 contacts the workpiece W1 may be set in advance as a threshold, and when the detected current value I1 exceeds the threshold, it may be determined that the finger 351 contacts the workpiece W1, and the detected encoder value A1 obtained at this time may be determined as the encoder value $A1_0$. The detected current value I1 and the detected encoder value A1 obtained when the positioning of the finger 351 is completed are respectively denoted by $I1_1$ and $A1_1$. Here, a stiffness coefficient K between the workpiece W1 and the finger 351 is expressed by the following equation (1).

$$K = N \times K_t \times I1_1 / (R \times \Delta x) \quad (1)$$

In the equation (1), $\Delta x$ is a difference between a position $x_1$ of the finger 351 converted from the encoder value $A1_1$ and a position $x_0$ of the finger 351 converted from the encoder value $A1_0$. That is, $\Delta x$ is the amount of displacement of the finger 351 caused by the holding force.

With a maximum current value $I_{max}$, the width Eb1 is expressed by the following equation (2).

$$Eb1 = N \times K_t \times I_{max} / (R \times K) \quad (2)$$

From the equations (1) and (2), the width Eb1 is expressed by the following equation (3).

$$Eb1 = \Delta x \times I_{max} / I1_1 \quad (3)$$

The maximum current value $I_{max}$ is a preset constant, and may be predetermined by a teacher in accordance with the performance of the motor 311. Although the amount of displacement $\Delta x$ of the finger 351 may be determined by the hand control device 500 from the profile of the detected current value I1 and the detected encoder value A1, it may be set as a constant obtained through an experiment conducted in advance.

In the present embodiment, the hand control device 500 sets the width Eb1, by using the current value $I1_1$ obtained when the detected encoder value A1 falls into the range R1, that is, obtained when the positioning of the finger 351 is completed. In addition, as in the first embodiment, the hand control device 500 determines from the width Eb1, the allowable range R20 corresponding to the range R2. Thus, since a teacher does not have to directly set the width Eb1, the operation of the teacher to set the width Eb1 can be eliminated.

As described above, also in the second embodiment, when the workpiece W1 is assembled to the workpiece W2, the range for evaluating the position of the finger is changed from the range R1 to the range R2. With this operation, when the workpiece W1 is assembled to the workpiece W2, false error signals are less produced. As a result, the production of products by the robot body 100 is less frequently stopped, which increases the productivity of the products. In addition, since the operation of the robot body 100 is stopped when the detected encoder value is out of the range R2, the reliability increases.

Furthermore, since the allowable range for the position of the finger 351 is widened when the workpiece W1 is assembled to the workpiece W2, the robot hand 300 can be lightened. In addition, the workpiece W1 can be assembled to the workpiece W2, with high accuracy.

Third Embodiment

Figure 10:
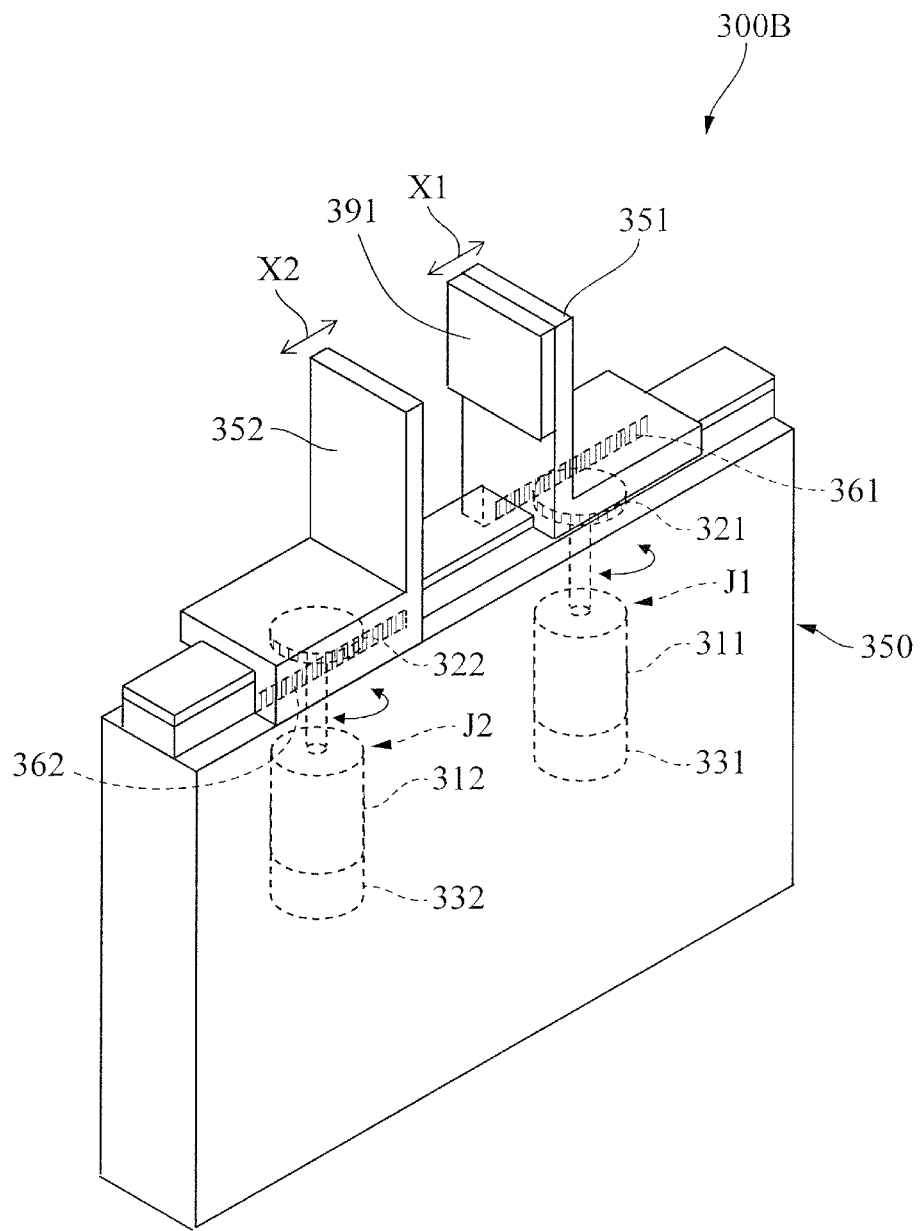
FIG. 10 is a perspective view of a robot hand of a third embodiment.

Next, robot control of a third embodiment will be described. In the first and the second embodiments, the position of the finger is evaluated. In the third embodiment, however, the force applied to the finger is evaluated. In the third embodiment, since the robot arm and the robot control device are the same as those of the first embodiment, the description thereof will be omitted. The third embodiment differs from the first embodiment in the configuration of the robot hand and the table. FIG. 10 is a perspective view of a robot hand of the third embodiment. FIG. 11 is an example of a table of the third embodiment.

As illustrated in FIG. 10, as in the first embodiment, a robot hand 300B of the third embodiment includes a hand body 350, and two fingers 351 and 352. Furthermore, the robot hand 300B of the third embodiment includes a force sensor 391 disposed on the finger 351. The force sensor 391 is an example of a detection unit. The force sensor 391 disposed on the finger 351 can detect force applied to the finger 351 in the X1 direction, which is a holding direction. The force sensor 391 may be a strain gauge or a piezoelectric element. The force sensor 391 is a sensor that outputs a signal corresponding to a state of the fingers 351 and 352 moved by the driving mechanisms J1 and J2. In addition, the force sensor 391 is a force detection unit that outputs a signal corresponding to force applied to the finger 351.

In the present embodiment, the motor driver 551 of the hand control device 500 of FIG. 3 feedback-controls the motor 311 based on a difference in value between a detected force and a target holding force. The value of the detected force is a detected value obtained from a signal sent from the force sensor 391, and the value of the target holding force is a target value. The detected value is a value corresponding to force applied to the finger 351.

In the third embodiment, a table 511B illustrated in FIG. 11 is used instead of the table 511 illustrated in FIG. 5. The table 511B will be specifically described. Unlike the table 511 of FIG. 5, the table 511B includes items on a target holding force Fref1, a width Ec1 for the target holding force Fref1, and another width Ed1 for the target holding force Fref1. Hereinafter, the driving mechanism J1 to drive the finger 351 will be described as an example for a case where the hold command number is 6.

The target holding force Fref1 is a target value of force applied to the finger 351. The width Ec1 is used to determine whether the positioning of the finger 351 for the target holding force Fref1 is completed. Thus, in a case where the workpiece W1 is held by the fingers 351 and 352, the positioning of the finger 351 is completed when the finger 351 is located within a range of Fref1±Ec1 that is a first range. The range of Fref1±Ec1 is referred to also as a completion range. The completion range of Fref1±Ec1 includes the target holding force Fref1. For example, when the target holding force Fref1 of the finger 351 is 10 N, and the width Ec1 is 2 N, the completion range for the positioning of the finger 351 is 10±2 N. The detected force that is a force value is determined from a signal outputted from the force sensor 391. When the detected force is in a range of 8 to 12 N, the positioning of the finger 351 is completed.

The width Ed1 is an allowable width in which the force applied to the finger 351 can vary after the positioning of the finger 351 and during a predetermined motion of the robot body 100, such as a motion performed when the workpiece W1 is assembled to the workpiece W2. Thus, when the workpiece W1 held by the fingers 351 and 352 is assembled to the workpiece W2, the range of Fref1±Ed1 that is a second range is allowed for the finger 351. Hereinafter, the range of Fref1±Ed1 is referred to also as an allowable range.

The allowable range of Fref1±Ed1 includes the target holding force Fref1. The allowable range Fref1±Ed1 is different from the completion range Fref1±Ec1. For example, when the target holding force Fref1 of the finger 351 is 10 N, and the width Ed1 is 5 N, the allowable range for the positioning of the finger 351 is 10±5 N. That is, when the force applied to the finger 351 is in the allowable range from 5 to 15 N, the robot control device 400 causes the robot body to continue the assembly operation of the robot body. In contrast, when the force applied to the finger 351 is out of the allowable range from 5 to 15 N, the robot control device 400 stops the motion of the robot body, as an error.

That is, in the third embodiment, the robot control device 400 controls the robot body, depending on the flowchart of FIG. 7 described in the first embodiment; but the determination processes of Step S13 and Step S17 of the third embodiment are different from those of the first embodiment. Hereinafter, the determination processes of Step S13 and Step S17 of the third embodiment will be described.

In Step S13, the hand control device 500 determines whether the detected force obtained from a signal from the force sensor 391 is within the completion range, 10±2 N, for the positioning of the finger 351. The hand control device 500 repeats Step S13 if the detected force is out of the completion range (S13: NO), or proceeds to the next step S14 if the detected force is within the completion range (S13: YES). With this operation, the holding of the workpiece W1 by the finger 351 is completed. With this control, the workpiece W1 can be held by the fingers 351 and 352 in a state where the workpiece W1 is positioned with high accuracy.

In Step S17, the hand control device 500 determines whether the detected force obtained from a signal from the force sensor 391 is within the allowable range that is 10±5 N. If the detected force is within the allowable range (S17: YES), then the hand control device 500 proceeds to Step S18 because there is no error. If the detected force is out of the allowable range (S17: NO), then the hand control device 500 outputs an error signal to the arm control device 600, and the arm control device 600 stops the operation of the robot body, that is the robot arm 200 (S19). Upon receiving the error signal, the arm control device 600 may cause the display device 815 of FIG. 3 to display an image indicating the error for informing a user of the error.

As described above, in the third embodiment, after the robot control device 400 causes the robot body 100 to start the predetermined operation in which the workpiece W1 is assembled to the workpiece W2, the robot control device 400 causes the robot body 100 to perform the assembly operation until the completion of the assembly operation, as long as the detected force is within the allowable range. In contrast, after the robot control device 400 causes the robot body 100 to start the predetermined operation, the robot control device 400 causes the robot to stop the assembly operation if the detected force is out of the allowable range.

Thus, when the workpiece W1 is assembled to the workpiece W2, the range for evaluating the force of the finger is changed. With this operation, when the workpiece W1 is assembled to the workpiece W2, false error signals are less produced. As a result, the production of products by the robot body is less frequently stopped, which increases the productivity of the products. In addition, since the operation of the robot body is stopped when the detected force is out of the allowable range, the reliability increases.

Furthermore, since the allowable range for the force applied to the finger 351 is widened when the workpiece W1 is assembled to the workpiece W2, the robot hand 300B can be lightened. In addition, the workpiece W1 can be assembled to the workpiece W2, with high accuracy.

In the third embodiment, although the force control is performed by using a value from the force sensor 391, it may be performed by using a current value of the motor 311 as in the first embodiment.

Fourth Embodiment

Figure 12:
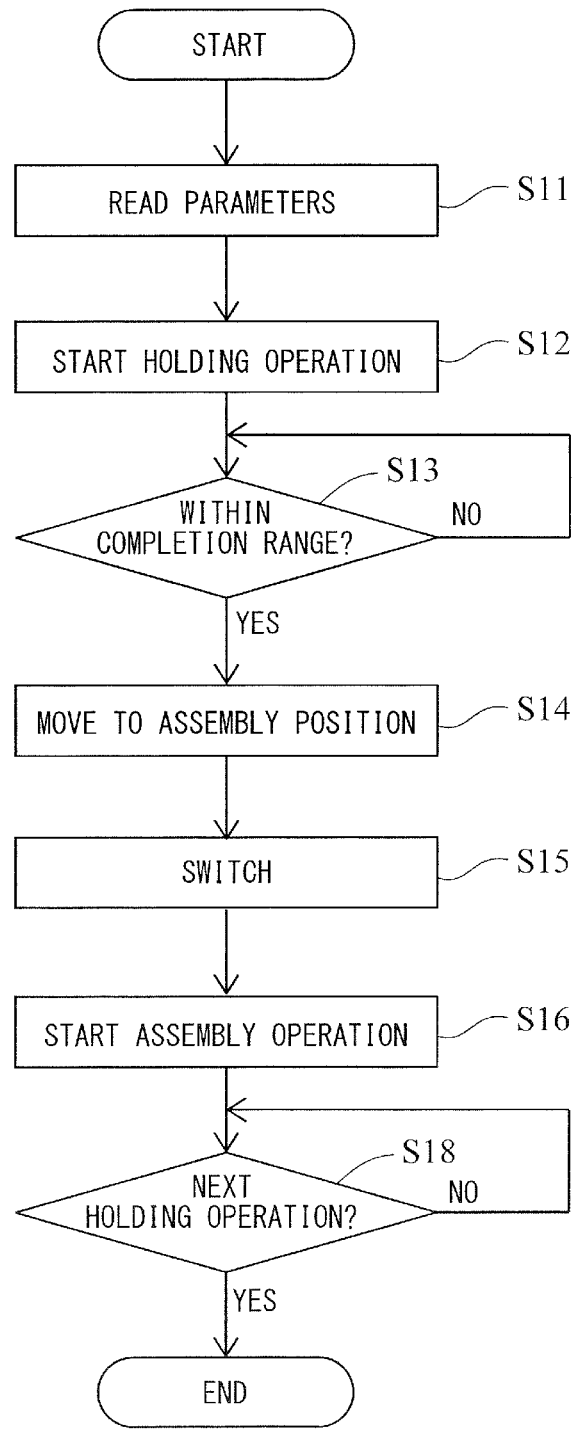
FIG. 12 is a flowchart illustrating a robot control method of a fourth embodiment.

Next, robot control of a fourth embodiment will be described. FIG. 12 is a flowchart illustrating a robot control method of the fourth embodiment. Since the configuration of a robot apparatus of the fourth embodiment is the same as that of the first embodiment illustrated in FIGS. 1 to 4, the description thereof will be omitted. In addition, the description will be made for a case where the fourth embodiment uses the table 511A of FIG. 9 described in the second embodiment. Furthermore, since the control for the driving mechanism J2 is the same as that for the driving mechanism J1, the description thereof will be omitted. Hereinafter, the description will be made for a case where the hold command number, outputted by the arm control device 600, is 4.

The steps S11 to S16 are the same as those of the flowchart of FIG. 7 described in the first embodiment. In the fourth embodiment, after Step S16, the hand control device 500 proceeds to Step S18, without executing Step S17 and Step S19 of FIG. 7.

In the fourth embodiment, after the robot control device 400 causes the robot body 100 to start to perform the assembly operation, the robot control device 400 causes the robot body 100 to perform the assembly operation until the completion of the assembly operation, regardless of whether the detected encoder value is out of the range R1 of FIG. 6. That is, after the robot control device 400 causes the robot body 100 to start to perform the assembly operation, the robot control device 400 causes the robot body 100 to perform the assembly operation until the completion of the assembly operation, regardless of whether the position of the finger is out of the completion range R10 of FIG. 6 for the positioning of the finger. In other words, after the robot control device 400 causes the robot body 100 to start to perform the assembly operation, the robot control device 400 does not monitor the detected value. Thus, since detecting no errors, the robot control device 400 does not stop the operation of the robot body 100. With such control, the robot hand 300 can be lightened. In addition, even when the assembly force is applied to the finger 351, the robot control device 400 detects no errors, and thus can cause the robot body to assemble the workpiece W1 to the workpiece W2 with high accuracy.

The present invention is not limited to the above-described embodiments, and may be variously modified within the technical concept of the present invention. In addition, the effects described in the embodiments are merely the most suitable effects produced by the present invention. Thus, the effects by the present invention are not limited to those described in the embodiments. In addition, since numerical values of the embodiments are merely examples, they are not intended to limit the present invention.

In the first to the fourth embodiments, the description has been made for the case where the robot arm 200 is a vertically articulated robot arm. The present disclosure, however, is not limited to this. For example, the robot arm may be any one of various robot arms, such as a horizontally articulated robot arm, a parallel link robot arm, and a Cartesian coordinate robot arm.

In the first to the fourth embodiments, the description has been made for the case where the robot hand has two fingers driven by motors. The present disclosure, however, is not limited to this. For example, the robot hand may have one, or three or more fingers.

In the first to the fourth embodiments, the description has been made for the case where the predetermined operation of the robot is to assemble the workpiece W1 to the workpiece W2. The present disclosure, however, is not limited to this. For example, the robot may perform another operation.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-193504, filed Oct. 12, 2018, which is hereby incorporated by reference herein in its entirety.

What is claimed is:

1. A method of controlling a robot performed by a controller, the robot comprising a finger, a driving unit configured to move the finger, and a detection unit configured to output a signal corresponding to a state of the finger, the method comprising:
 causing the finger to hold a workpiece based on a target value of the state of the finger when the finger holds the workpiece;
 causing the robot to start a predetermined operation of moving the workpiece in a state where the finger holds the workpiece if a detected value based on the signal outputted from the detection unit when the workpiece is held by the finger is within a first range set with respect to the target value of the state of the finger when the finger holds the workpiece; and
 causing the robot to continue to perform the predetermined operation until completion of the predetermined operation if the detected value is within a second range set with respect to the target value of the state of the finger when the finger holds the workpiece,
 wherein the second range is a range in which an error is not determined even if the finger changes from being at the target value to outside the first range while the robot is performing the predetermined operation, and a size of the second range is different from a size of the first range.

2. The method according to claim 1, wherein the controller stops the predetermined operation of the robot body if the detected value is out of the second range in the predetermined operation.

3. The method according to claim 2, wherein the controller is connected with a display device, and
 wherein the controller causes the display device to display an occurrence of an error when the controller stops the predetermined operation of the robot.

4. The method according to claim 1, wherein the second range includes the first range, and is larger than the first range.

5. The method according to claim 1, wherein the detection unit is a position detection unit configured to output a signal corresponding to a position of the finger.

6. The method according to claim 1, wherein the detection unit is a force detection unit configured to output a signal corresponding to force applied to the finger.

7. The method according to claim 1, wherein the driving unit comprises a motor, and
 wherein the detection unit is a current detection unit configured to output a signal corresponding to current that flows in the motor.

8. The method according to claim 1, wherein the second range is a range in which the finger is allowed to move while the workpiece is held by the finger in the predetermined operation.

9. The method according to claim 1, wherein the controller determines that the finger has finished holding the workpiece if the detected value has been within the first range for a predetermined time.

10. The method according to claim 1, wherein the controller causes the finger to hold the workpiece again if the detected value deviates from the first range during a predetermined time after the detected value becomes within the first range.

11. The method according to claim 1, wherein the predetermined operation includes an insert operation of inserting the workpiece into another workpiece.

12. The method according to claim 11, wherein the second range is wider than the first range in a direction opposite to a direction in which the workpiece is inserted into the other workpiece.

13. The method according to claim 11, wherein in the insert operation, the controller causes the robot to continue to insert the workpiece into the other workpiece until completion of the insert operation if the detected value is within the second range.

14. The method according to claim 11, wherein the controller determines whether the holding of the workpiece is completed based on the detected value and the first range, and
 wherein the controller determines whether to continue the insertion of the workpiece based on the detected value and the second range.

15. The method according to claim 11, wherein the controller controls the finger based on the detected value and the first range before a part of the workpiece is inserted into the other workpiece, and
 wherein the controller controls the finger based on the detected value and the second range after the part of the workpiece is inserted into the other workpiece.

16. The method according to claim 1, wherein the controller sets the first range as a range used for evaluating the detected value when starting to cause the finger to hold the workpiece, and
 wherein after causing the finger to hold the workpiece, and when starting to cause the robot to perform the predetermined operation, the controller switches the range used for evaluating the detected value from the first range to the second range.

17. A computer-readable non-transitory recording medium storing a program that causes a computer to perform the method according to claim 1.

18. The method according to claim 1, wherein the first range and second range are set to include the target value of the state of the finger when the finger holds the workpiece.

19. The method according to claim 1, wherein the first range is set to have a first width with respect to the target value of the state of the finger when the finger holds the workpiece, and the second range is set to have a second width different from the first width with respect to the target value of the state of the finger when the finger holds the workpiece.

20. The method according to claim 19, wherein the first width and second width are respectively set in both of a positive direction and negative direction from the target value of the state of the finger when the finger holds the workpiece.

21. The method according to claim 1, wherein the controller automatically sets the second range.

22. The method according to claim 1, wherein the first range and the second range are set by the user.

23. The method according to claim 1, wherein the controller does not monitor the detected value detected by the detection unit in the predetermined operation based on a predetermined condition.

24. The method according to claim 1, wherein the target value is a target value of the state of the finger when the finger holds the workpiece of a position of the finger, or a target value of a force of the finger, or a target value of a current of the driving unit.

25. The method according to claim 1, wherein the finger is displaced from the target value when the robot performs the predetermined operation with the finger holding the workpiece.

26. The method according to claim 1, wherein the second range is a range in which the finger is allowed to move from being at the target value while the robot is performing the predetermined operation.

27. The method according to claim 1, wherein the second range is a range in which the finger is able to move from being at the target value while the robot is performing the predetermined operation.

28. The method according to claim 1, wherein the second range is a range in which the finger is allowed to displace from being at the target value while the robot is performing the predetermined operation.

29. The method according to claim 1, wherein the controller stops the robot as the error.

30. The method according to claim 1, wherein the controller switches the first range or the second range used to determine the error on a basis of a switching condition.

31. The method according to claim 30, wherein the switching condition is when the detected value is within the first range for a predetermined time and a switching signal is obtained to switch an operation to be performed by the robot to the predetermined operation.

32. The method according to claim 1, wherein the target value is a target position of the finger, the first range is a range of ±0.005 mm with respect to the target value, and the second range is a range of ±0.1 mm with respect to the target value.

33. The method according to claim 1, wherein the target value is a target holding force of the finger, the first range is a range of ±2 N with respect to the target value, and the second range is a range of ±5 N with respect to the target value.

34. The method according to claim 1, wherein a direction in which the workpiece is moved is parallel to a direction in which the finger is moved by the driving unit.

35. A method of manufacturing a product by using a robot, the robot being controlled by a controller and comprising a finger, a driving unit configured to move the finger, and a detection unit configured to output a signal corresponding to a state of the finger, the method comprising:

causing the finger to hold a workpiece based on a target value of a state of the finger when the finger holds the workpiece;

causing the robot to start an assembly operation for the workpiece if a detected value based on the signal outputted from the detection unit when the workpiece is held by the finger is within a first range set with respect to the target value of the state of the finger when the finger holds the workpiece, the assembly operation including a predetermined operation of moving the workpiece in a state where the finger holds the workpiece; and causing the robot to continue to perform the assembly operation until completion of the assembly operation if the detected value is within a second range set with respect to the target value of the state of the finger when the finger holds the workpiece, wherein the second range is a range in which an error is not determined even if the finger changes from being at the target value to outside of the first range while the robot is performing the predetermined operation, and a size of the second range is different from a size of the first range.

36. A robot apparatus comprising:
a robot comprising:
   a finger;
   a driving unit configured to move the finger; and
   a detection unit configured to output a signal corresponding to a state of the finger; and
a controller configured to control the robot,
wherein the controller is configured to:
   cause the finger to hold a workpiece based on a target value of the state of the finger when the finger holds the workpiece,
   cause the robot to start a predetermined operation of moving the workpiece in a state where the finger holds the workpiece if a detected value based on the signal outputted from the detection unit when the workpiece is held by the finger is within a first range set with respect to the target value of the state of the finger when the finger holds the workpiece, and
   cause the robot to continue to perform the predetermined operation until completion of the predetermined operation if the detected value is within a second range set with respect to the target value of the state of the finger when the finger holds the workpiece,
wherein the second range is a range in which an error is not determined even if the finger changes from being at the target value to outside the first range while the robot is performing the predetermined operation, and a size of the second range is different from a size of the first range.

* * * * *